United States Patent [19]

Kleuver

[11] Patent Number: 4,477,109
[45] Date of Patent: Oct. 16, 1984

[54] CONNECTOR FOR HOSES AND THE LIKE

[75] Inventor: Guenther F. Kleuver, Rockford, Ill.

[73] Assignee: GFK Partnership, Rockford, Ill.

[21] Appl. No.: 288,129

[22] Filed: Jul. 29, 1981

[51] Int. Cl.³ .............. F16L 17/00; F16L 47/00; F16L 21/00; F16L 37/00
[52] U.S. Cl. .................. 285/361; 285/376; 285/331; 285/110; 285/396; 285/402; 285/423
[58] Field of Search .............. 285/360, 361, 376, 331, 285/110, 396, 401, 402, 423

[56] References Cited

U.S. PATENT DOCUMENTS

| | | | |
|---|---|---|---|
| 795,069 | 7/1905 | Settlage | 285/376 |
| 1,490,771 | 4/1924 | Fortin et al. | 285/376 X |
| 1,578,808 | 3/1926 | Cummins | 285/361 |
| 1,890,011 | 12/1932 | Wirz et al. | 285/376 X |
| 2,228,243 | 1/1941 | Baker | 285/376 X |
| 4,045,055 | 8/1977 | Blakely | 285/110 X |
| 4,219,222 | 8/1980 | Brusadin | 285/423 X |

FOREIGN PATENT DOCUMENTS 642982 6/1962 Canada .................. 285/376

Primary Examiner—Richard J. Scanlan, Jr.
Attorney, Agent, or Firm—Leydig, Voit, Osann, Mayer & Holt, Ltd.

[57] ABSTRACT

A connector for coupling a hose to a faucet or the like includes two molded plastic members which are coupled together by a bayonet-type connection. One member carries a resilient seal which has an annular lip inclined radially inwardly and axially toward an axially facing annular sealing surface on the other member. When the members are coupled, the lip flattens against the sealing surface to form a seal between the members and, in this condition of the parts, the resiliency of the lip also produces a force which keeps the bayonet-type connection in the locked position. When the members are being coupled while water is running through the member with the seal, an annular groove in the sealing surface causes water to backwash and clean the sealing side of the lip as well as the sealing surface itself.

11 Claims, 15 Drawing Figures

CONNECTOR FOR HOSES AND THE LIKE

BACKGROUND OF THE INVENTION

This invention relates to a connector for coupling a hose to a faucet, another hose or any one of a variety of implements and, more particularly, to one which comprises an inlet member and an outlet member with means for coupling the two members. Prior connectors of this type have a number of drawbacks among which are the use of moving parts, difficulty in coupling the members, and the tendency of the parts to become dirty or to corrode and thus "freeze".

SUMMARY OF THE INVENTION

The principal object is to provide a new and improved connector of the foregoing type in which the two members may be quickly and easily coupled without the use of moving parts and which, when the members are coupled, provides a highly effective seal without the parts becoming corroded.

A more detailed object is to achieve the above by mounting a seal in the inlet member with the seal having a resilient annular lip which is inclined radially inwardly and axially toward an axially facing annular sealing surface on the outlet member so that the lip is resiliently flattened into sealing engagement with the sealing surface when the members are coupled and is held in sealing engagement by the pressure fluid flowing through the connector.

Another object is to couple the inlet and outlet members with a bayonet-type connection and to utilize the resiliency of the lip of the seal to provide a force which holds the parts of the connection in coupled engagement.

A further object is to provide a connector in which the parts, and especially the lip of the seal and the sealing surface, may be cleaned automatically as an incident to the coupling of the members.

The invention also resides in the novel details of the construction of the connector.

BRIEF DESCRIPTION OF THE DRAWINGS

FIG. 5 is an enlarged sectional view taken along the line 6—6 in FIG. 1.

DETAILED DESCRIPTION OF THE PREFERRED EMBODIMENT

Figure 1:
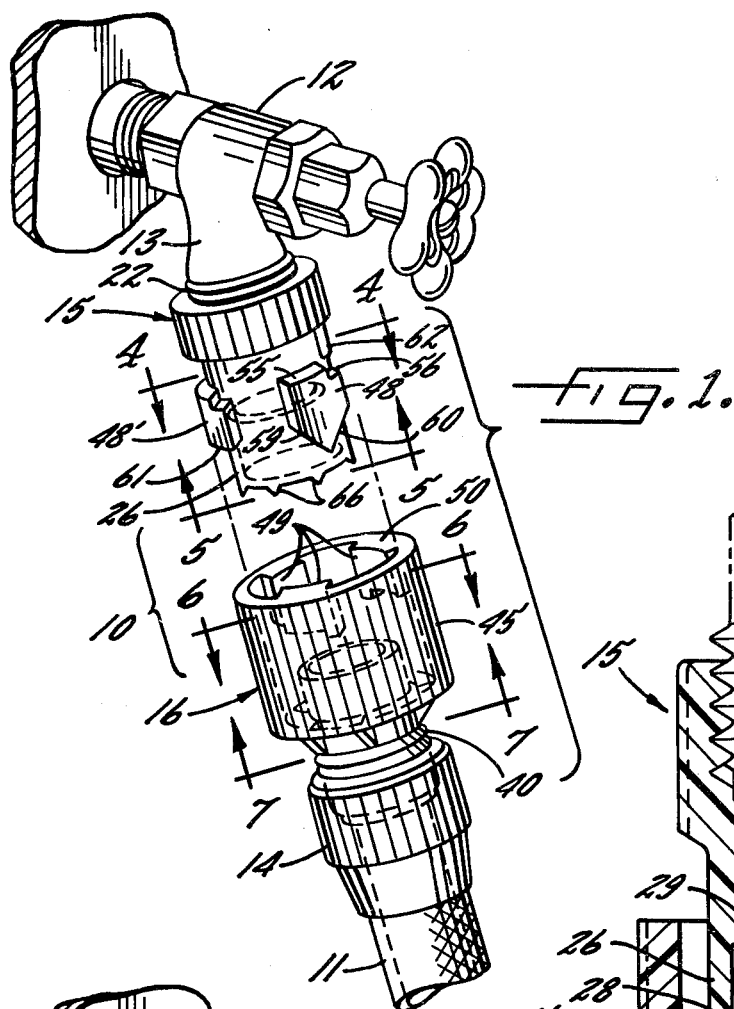
FIG. 1 is a fragmentary perspective view of a connector constructed in accordance with the present invention, with the connector used to couple a hose to a faucet and with the two members of the connector uncoupled.
Figure 2:
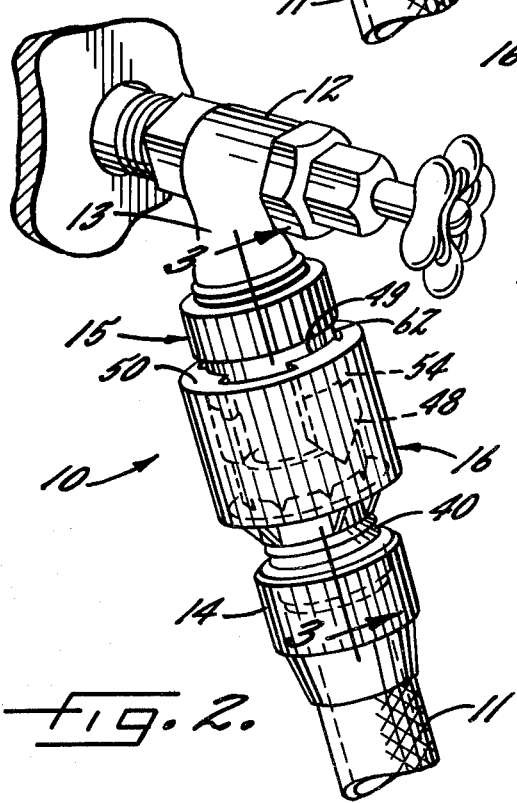
FIG. 2 is a view similar to FIG. 1 but with the members of the connector being coupled.

While the invention is suitable for connecting a wide variety of implements and accessories to different types of pressure fluid sources, it is shown in the drawings for purposes of illustration as embodied in a connector 10 for connecting a garden hose 11 to an outside faucet 12 of a house. Thus, one end of the connector is threaded onto the spigot 13 of the faucet and the other end is threaded into a fitting 14 on the end of the hose.

In accordance with an important aspect of the invention, the connector 10 is made of two members or parts 15 and 16 which may be quickly and easily connected to each other and which, when connected, provide an effective seal without corrosion and hence without "freezing" of the parts together and without the use of moving parts. Thus, in the illustrated form, the inlet part 15 may be threaded tightly on the spigot 13 and left in place while the outlet part 16 similarly may be threaded into the fitting 14 and left in place. Then, the hose 11 is connected to the spigot 13 simply by slipping the outlet part onto the inlet part and turning the outlet part slightly relative to the inlet part at which time a novel sealing mechanism 17 (FIG. 3) produces an effective seal between the parts. In a more detailed aspect of the invention, the sealing mechanism serves the additional function of reliably locking the outlet part on the inlet part while permitting the two parts to be easily disconnected.

Figure 3:
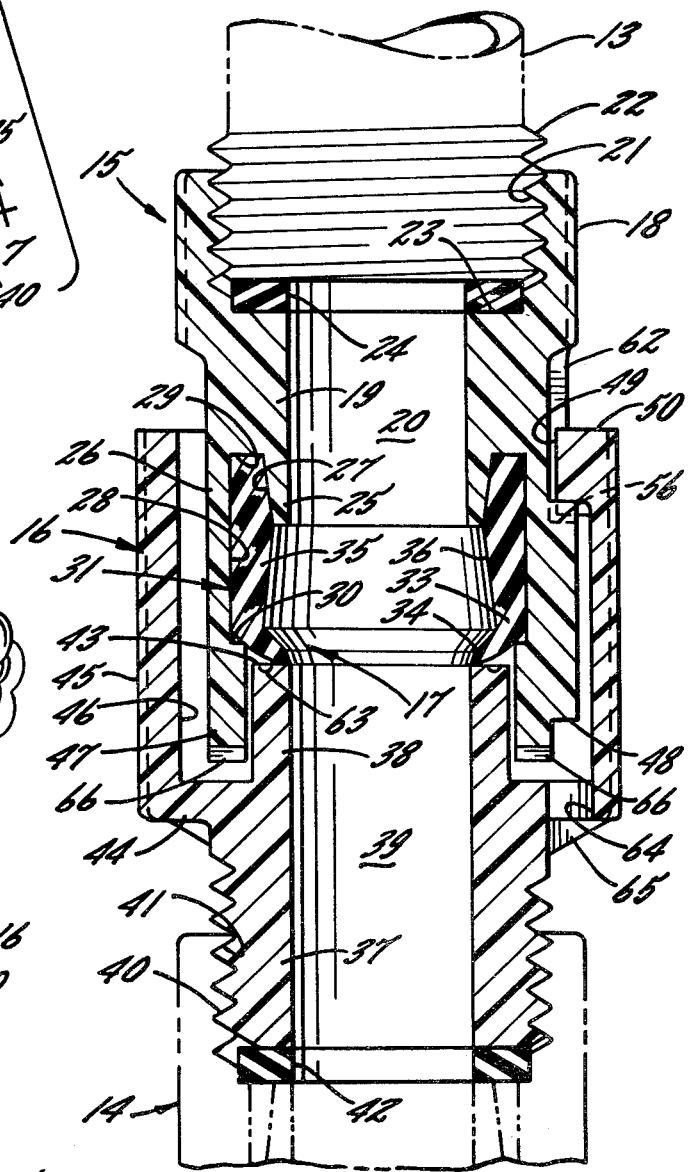
FIG. 3 is an enlarged fragmentary sectional view taken along the line 3—3 in FIG. 2.

More particularly, the inlet part 15 is a unitary member made of a rigid plastic material such as molded nylon and is generally cylindrical with an inlet end portion 18 at one end, an inner end portion 19 at the other end and a central passage 20 for a fluid under pressure such as water (FIG. 3). The inlet end portion of the part 15 is an externally ribbed collar having internal threads 21 which surround the passage 20 and which are adapted to be threaded onto the conventional threads 22 on the spigot 13 of the faucet 12. Seated on an internal shoulder 23 formed in the body of the part adjacent the inner end of the threads 21 is a seal ring 24 which abuts the end of the spigot and provides a seal between the inlet part and the faucet. The inner end portion 19 of the part 15 is reduced in diameter and includes an axial flange 25 the inner surface of which forms a part of the passage 20. As an integral portion of the inlet part 15, a cylindrical skirt 26 is radially spaced from the axial flange 25 and projects an appreciable distance beyond the end of the flange.

As shown most clearly in FIG. 3, the outer wall 27 of the axial flange 25 and the inner wall 28 of the skirt 26 form an annular pocket 29 and, preferably, the wall of the flange is tapered inwardly toward the inner end of the part 15. The inner wall of the skirt extends a substantial distance beyond the end of the axial flange and, beyond the end of this wall, the internal diameter of the skirt is reduced to form an annular shoulder 30. The novel sealing mechanism 17 includes an annular or generally cylindrical seal 31 molded of a resilient plastic material such as urethane with the outer wall of the seal seated against the inner wall 28 of the skirt. The outer end portion 32 of the seal 31 is received snugly in the pocket 29 and the inner end 33 of the seal rests on the shoulder 30. As an integral part of the seal, an annular lip 34 projects radially inwardly from the inner end 33 of the seal and is inclined away from the inlet portion 18 of the part 15. The mid-portion 35 of the seal 31 between the end portion 32 and the lip 35 defines an axial passage 36 which is a continuation of the passage 20. For a purpose to be described later, the diameter of the inner wall 36 of the mid-portion 35 progressively increases toward the lip 34.

As in the case of the inlet part 15, the outlet part 16 is a unitary member made of a rigid material such as molded nylon and is generally cylindrical in shape with an outlet end portion 37 at one end and an inner end portion 38 at the other end. The outlet end portion 37 is formed with a central passage 39 which is alined with and forms a continuation of the passages 20 and 36 so as, in the form shown, to complete the connection between the spigot 13 and the hose 11. External threads 40 formed on the outlet end portion 37 of the part 16 are received in the threads 41 in the fitting 14 and this end portion is threaded down firmly against a seal ring 42 seated in the fitting. The outer diameter of the inner end portion 38 is somewhat smaller than the inside diameter of the skirt 26 to telescope loosely within the latter and the end surface 43 on the end portion 38 faces axially and is an annular sealing surface which coacts with the lip 34 of the seal 31 and forms part of the sealing mechanism 17. Thus, as will be explained more in detail, the sealing surface 43 engages the lip as the end portion 38 is inserted into the skirt and the lip is partially flattened against the sealing surface to form the seal between the parts 15 and 16 (see FIGS. 3 and 15). Above the threads 40 and spaced a substantial distance behind the sealing surface 43 is an annular flange 44 which is integral with the member 16 and projects radially outwardly therefrom. Upstanding from the periphery of the flange 44 and integral therewith is an externally ribbed cylindrical sleeve 45 which telescopes over the skirt 26 when the members 15 and 16 are connected, the inner surface 46 of the sleeve opposing and being spaced from the outer surface 47 of the skirt.

To provide a quick and easy connection of the inlet and outlet members 15 and 16, the latter are coupled by a connection generally of the bayonet type. In general, this connection includes parts 48 and 48' which are formed on the exterior of the skirt 26 of the inlet member and which coact with parts 49 formed on the inside surface of the sleeve 45 on the outlet member. In the present instance, there are two parts 48' and one part 48 with the three parts molded as projections on the skirt 26 and being angularly spaced equidistantly around the latter. Similarly, there are three parts 49 molded as projections on the inner wall 46 of the sleeve 45 and angularly spaced equidistantly around this wall. The space between adjacent parts on the skirt is slightly greater than the arcuate width of the parts on the sleeve and, conversely, the space between parts on the sleeve is slightly greater than the arcuate width of the parts on the skirt. In this way, the parts 49 pass between the parts 48 and 48' and then interlock with the latter as the sleeve is telescoped over the skirt and the outlet member thereafter is turned relative to the inlet member.

Figure 9:
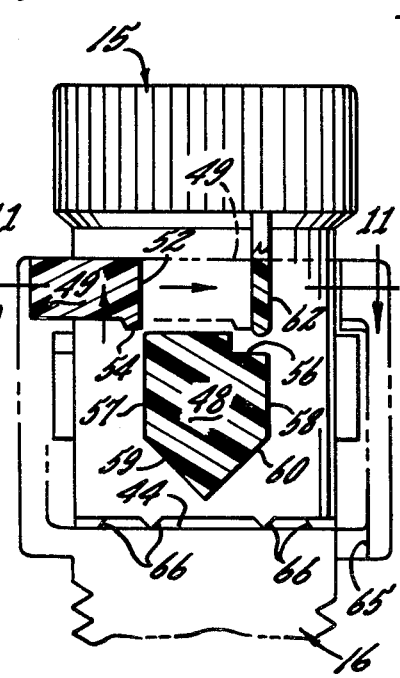
FIG. 9 is a view similar to FIG. 8 showing the parts in a moved position.

More specifically, each part 49 on the outlet member 16 has its upper edge 50 flush with the upper end of the sleeve 45 (see FIGS. 1 and 10) and is formed with vertical side edges 51 and 52 and a horizontal lower edge 53. Adjacent the right edge 52 as viewed in FIG. 10, a short ear 54 projects down below the lower edge 53. The parts 48 and 48' on the inlet member 15 are spaced below the collar 18 a distance somewhat greater than the distance from the lower ends of the ears 54 to upper end of the sleeve 45 so that, when the cylinder and the skirt 26 are fully telescoped as shown in FIG. 9, the parts 48 and 48' are beyond the lower edges of the ears. In this condition of the two members, the part 49 may be turned to a position under the parts 48 and 48' when the outlet member is turned relative to the inlet member.

Figure 4:
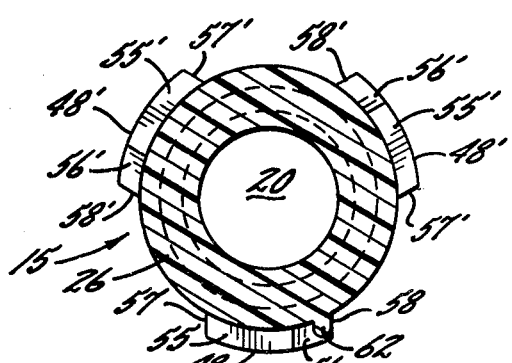
FIG. 4 is an enlarged sectional view taken along the line 4—4 in FIG. 1.
Figure 5:
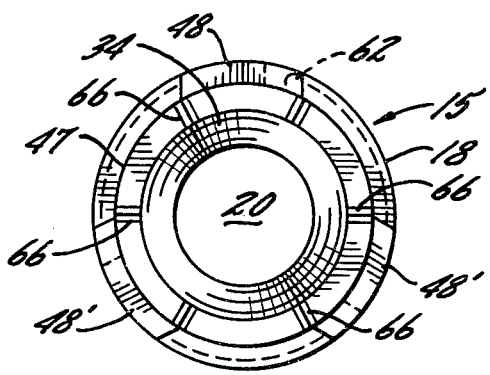
FIG. 5 is an enlarged sectional view taken along the line 5—5 in FIG. 1.
Figure 6:
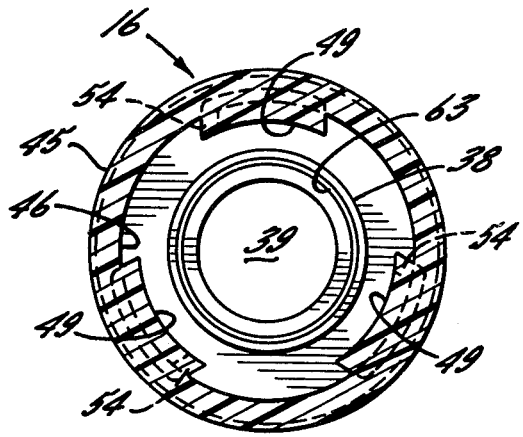
Figure 8:
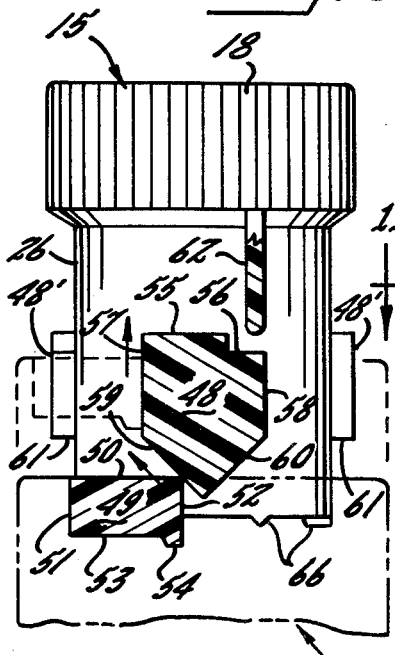
FIG. 8 is an enlarged fragmentary side view of the connector with parts broken away and shown in section.
Figure 10:
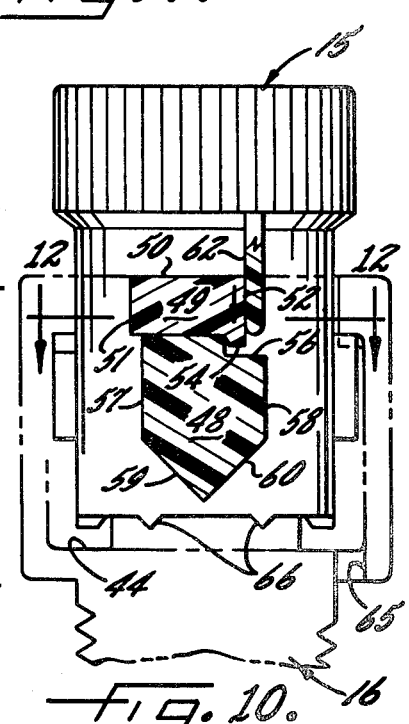
FIG. 10 is a view similar to FIG. 8 but showing the parts in a further moved position.

As viewed in FIGS. 8, 9 and 10, the part 48 has a straight horizontal upper edge 55 with a notch 56 in the upper right hand corner for receiving one of the ears 54 and the side edges 57 and 58 are vertical. The lower portion of the part 48 is V-shaped to provide inclined edges 59 and 60 which, as illustrated in FIG. 8, engages a corner of one of the parts 49 as the sleeve 45 is telescoped over the skirt 26 to produce a camming action which turns the outlet member 16 until the parts 49 are alined with the spaces between the parts 48 and 48'. The two parts 48' are similar to the part 48 in that they have the same upper edge 55', notch 56 and side edges 57' and 58' (see FIGS. 1 and 4) but, instead of having the V-shaped lower portion, these parts have a horizontal lower edge 61 at the ends of the side edges 57' and 58'.

Figure 11:
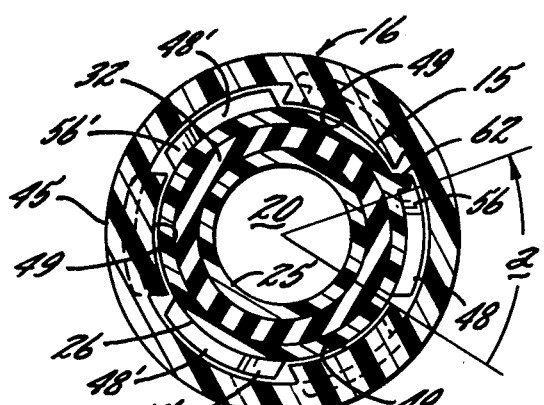
FIG. 11 is a sectional view taken along the line 11—11 in FIG. 9.
Figure 12:
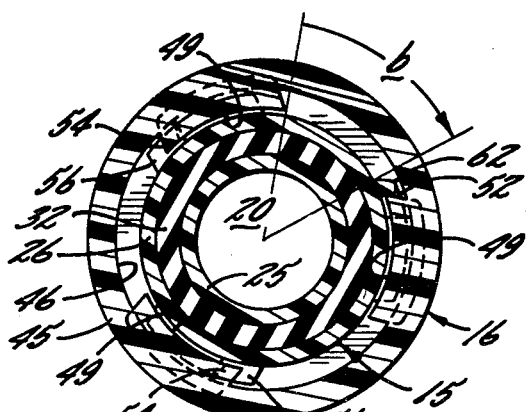
FIG. 12 is a sectional view taken along the line 12—12 in FIG. 10.
Figure 13:
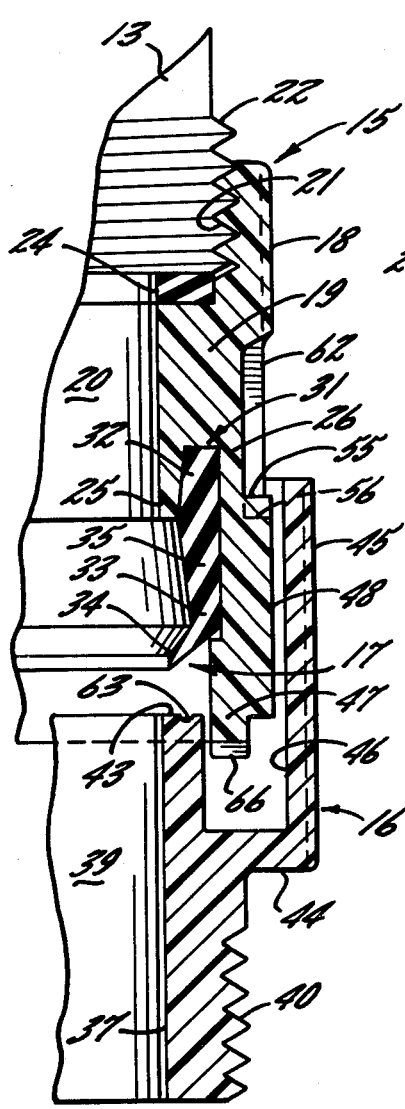
FIG. 13 is a view similar to FIG. 3 but showing the parts during the initial coupling of the members.
Figure 14:
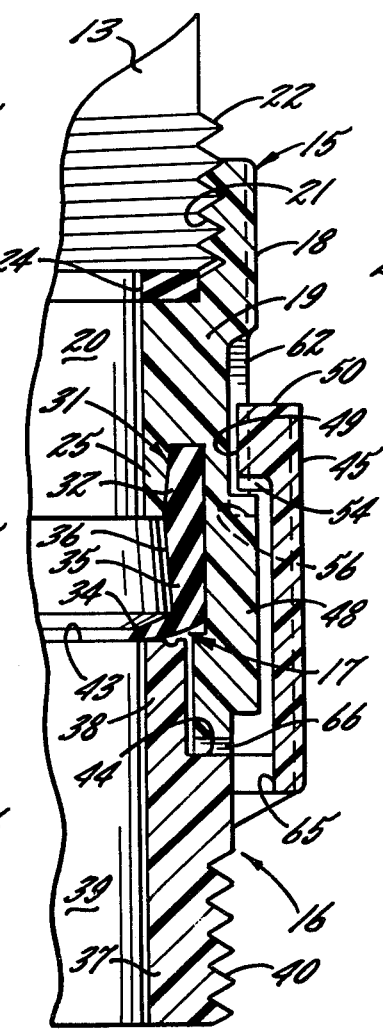
FIG. 14 is a view similar to FIG. 13 but showing the parts in an intermediate position during coupling.
Figure 15:
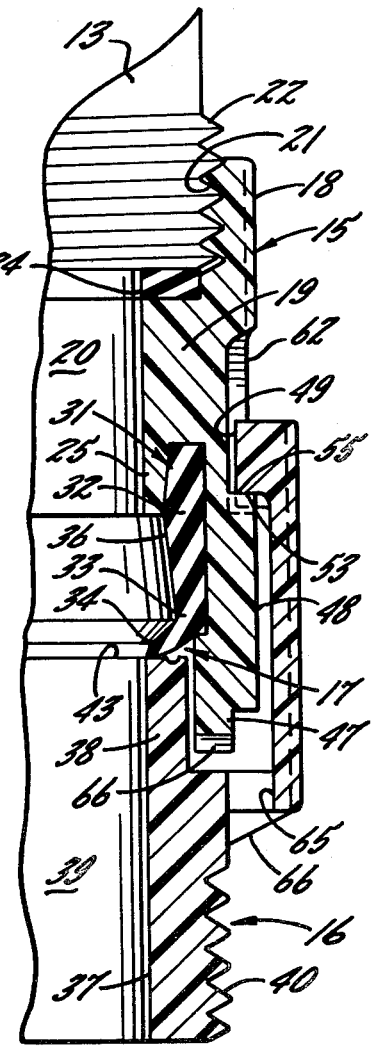
FIG. 15 is a view similar to FIG. 13 but showing the parts with the members as finally coupled.

In accordance with another aspect of the invention, the annular seal 31 and particularly its lip 34 is utilized to perform the additional function of locking the parts 49 in engagement with the parts 48 and 48'. Thus, as the sleeve 45 is telescoped over the skirt 26, the lip of the seal engages the sealing surface 43 before the upper edges 55 and 55' of the parts 48 and 48' have passed beyond the ears 52 on the parts 49. As this telescoping action is continued, the lip is resiliently flattened against the sealing surface until the edges 55 and 55' have passed beyond the ears (see FIGS. 9 and 14). At this time, the outlet member 16 is turned to the right as viewed in FIG. 9 (counter-clockwise as viewed in FIG. 11) through an angle a to bring the ears 54 over the notches 56 and 56', this angle being on the order of 50 degrees in the preferred embodiment. Then, when the outlet member is released, it is resiliently urged in the opposite direction by the lip 34 to project ears into the notches as shown in FIG. 10 thereby locking the members 15 and 16 together. In the locked position, however, the lip is still partially flattened against the sealing surface 43 as illustrated in FIG. 15 to produce the seal between the members 15 and 16. In order to position the ears 54 over the notches 56 and 56' as the outlet member 16 is turned on the inlet member 15, a longitudinal rib 62 (FIGS. 8, 9 and 10) is formed on the inlet member above the end of the notch 56 in the part 48. Thus, as the outlet member is turned, one of the parts 49 abuts the rib as shown in broken lines in FIG. 9 and this stops the turning. At that time, the ears are alined with the notches and the outlet member is released so that the lip 34 of the seal 31 moves the ears into the notches and locks the two members together. To disconnect the members, the outlet member is pushed toward the collar 18 on the inlet member against the resiliency of the lip 34 until the ears 54 clear the upper edges 55 and 55' of the parts 48 and 48' and then the outlet member is turned in the opposite direction (to the left as viewed in FIG. 9 and clockwise as viewed in FIG. 12) through an angle b which is substantially equal to the angle a. At that point, the parts 49 are clear of the parts 48 and 48′ and the lip 34 urges the outlet member away from the collar 18 after which the outlet member is simply removed by hand.

When the outlet member 16 is connected to inlet member 15, the pressure fluid such as water acts on the seal 31 to more firmly hold the latter in place and to reinforce the sealing engagement between the lip 34 and the sealing surface 43. Thus, because of the incline of the inner wall 36 of the mid-portion 35 of the seal, the pressure of the fluid acting against this wall compresses the seal both radially outwardly and axially toward the collar 18 so that the seal is pressed against the inner wall 28 of the skirt 26 and also is forced firmly in the pocket 27. At the same time, the pressure acts downwardly on the lip 34 and this flattens the lip further against the sealing surface 43 and holds the two in tight sealing engagement.

In the more detailed aspects, the invention contemplates constructing the foregoing arrangement so that the inlet and outlet members 15 and 16, and particularly the sealing surface 43 and the lip 34 of the seal 31, may be cleaned automatically as the outlet member is connected to the inlet member. Primarily, such cleaning is accomplished by running water, such as by opening the faucet 12, through the inlet member as the outlet member is being connected to the latter. It will be apparent that the flowing water cleans the walls of the passages 20, 36 and 39 as well as the upper surface of the lip 34. To thoroughly clean the sealing surface 43 as well as the underside of the lip, the sealing surface is formed with an annular groove 63 which causes a backwashing action of the water impinging on the sealing surface. This backwash action causes water to flow up against and wash the underside of the lip as well as to supplement the washing of the sealing surface. Thus, a tight seal between the lip and the sealing surface is assured.

Figure 7:
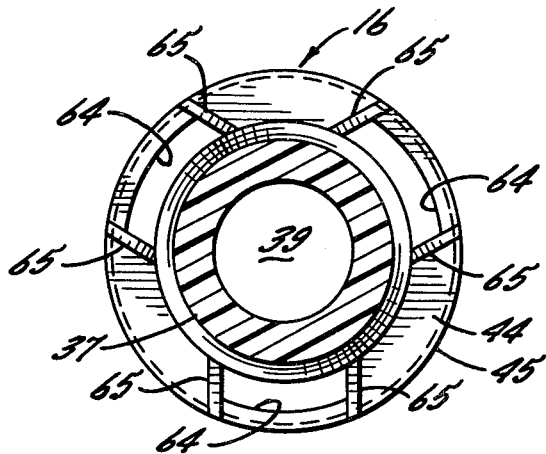
FIG. 7 is an enlarged sectional view taken along the line 7—7 in FIG. 1.

To prevent water from spraying out between the inlet and outlet members 15 and 16 as the outlet member is connected to the inlet member with the water running, the flange 44 on the outlet member is formed with a plurality of openings 64 (FIGS. 3 and 7) which are large enough to permit water to flow freely through them. In the present instance, there are three such openings spaced equidistantly around the flange with reinforcing ribs 65 disposed at each side of each opening. With this arrangement, water flowing through the inlet member is deflected by the skirt 26 either into the passage 39 or into the space inside the sleeve 45 and out through openings 64, the flow through the openings being generally axial.

Means also are provided to clean the upper surface of the flange 44 as an incident to the coupling of the outlet member 16 to the inlet member 15. Herein, this means comprises a plurality of teeth 66 (FIGS. 1, 9 and 14) projecting axially from the end of the skirt 26 and molded integrally with the latter. In the present instance, there are six teeth spaced equidistantly around the skirt and the length of the teeth is such that, when the outlet member has been telescoped on the inlet member to the point where the parts 49 have cleared the parts 48 and 48′ as shown in FIG. 9, the teeth are in firm contact with the flange. Thus, as the outlet member is turned to complete the connection between the two members, the teeth scrape any dirt and other foreign matter off the flange 44 and this falls out through the openings 64.

It will be observed that the connector 10 is relatively inexpensive to make and the inlet and outlet members 15 and 16 are easily coupled and provide a highly effective seal without the use of any moving parts. Moreover, the pressure fluid flowing through the connector both increases the sealing action and aids in holding the seal 31 in place. By having the skirt 26 project a substantial distance beyond the lip 34 of the seal and with the sleeve 45 extending well beyond the sealing surface 43, the sealing elements are reasonably well protected when the two members are not coupled. In addition, these elements may be thoroughly washed as the members are being coupled.

I claim:

1. A connector for hoses and the like having, in combination, a first tubular member having an inlet end portion and a first sealing end portion, a second tubular member having an outlet end portion and a second sealing end portion opposing said first sealing end portion, one of said members having a cylindrical skirt encircling and projecting axially beyond the sealing end portion of that member and the other of said members having a cylindrical sleeve encircling and extending beyond the sealing end portion of that member, said sleeve telescoping with said skirt, said members having alined axial passages for the flow of pressure fluid from said inlet end portion to said outlet end portion, an axially facing annular sealing surface formed on the sealing end portion of said second member and encircling the passage in that member, said surface facing said inlet end portion of said first member, a cylindrical sealing element of resilient material carried by the sealing end portion of said first member and encircling the passage in that member, an annular lip formed on said element and opposing said sealing surface around the entire circumference thereof, said lip being inclined radially inwardly and axially toward said annular sealing surface to engage and to flex and at least partially flatten against the surface around the entire circumference thereof when said sleeve and said skirt are telescoped, said pressure fluid urging said lip against said sealing surface, and means for releasably connecting said members with said sleeve and said skirt telescoped.

2. A connector as defined in claim 1 in which said sealing element abuts the inner surface of said inlet portion of said first member and the inside diameter of said element increases progressively toward said lip, and pocket means on said first member engaging the end portion of said sealing element opposite said lip whereby pressure fluid flowing through said element produces a force on the element which force holds the element against said inner surface and urges said end portion of the element toward said pocket means.

3. A connector as defined in claim 1 including an annular groove formed in said sealing surface whereby, when said sleeve and said skirt are telescoped with water under pressure flowing through said passages, the water impinging said groove backwashes and cleans said sealing surface and the opposing surface of said lip.

4. A connector for hoses and the like having, in combination, a first tubular member having an inlet end portion and a first sealing end portion, a second tubular member having an outlet end portion and a second sealing end portion telescoping with said first sealing end portion, one of said members having a cylindrical skirt encircling and projecting axially beyond the sealing end portion of that member and the other of said members having a cylindrical sleeve encircling and extending beyond the sealing end portion of that member, said sleeve telescoping with said skirt, said members having alined axial passages for the flow of pressure fluid from said inlet end portion to said outlet end portion, an axially facing annular sealing surface formed on the sealing end portion of said second member and encircling the passage in that member, said surface facing said inlet end portion of said first member, a cylindrical sealing element of resilient material carried by the sealing end portion of said first member and encircling the passage in that member, an annular lip formed on said element and opposing said sealing surface around the entire circumference thereof, said lip being inclined radially inwardly and axially toward said sealing surface to engage and to flex and at least partially flatten against the surface around the entire circumference thereof when said sleeve and said skirt are telescoped, said pressure fluid urging said lip against said sealing surface, and means for releasably connecting said members with said sleeve and said skirt telescoped, said means including a first set of parts formed on and angularly spaced around an exterior portion of one of said members and a second set of parts formed and angularly spaced around an interior portion of the other of said members, said parts being positioned so that one set of parts passes between the other set of parts as said sleeve and said skirt are telescoped and thereafter said two sets of parts being generally axially alined when one of said members is turned relative to the other, said lip urging said sets of parts into engagement when the latter are axially alined.

5. A connector as defined in claim 4 in which each part of said first set has a portion interlockable with a portion of a corresponding part of said second set when the parts of the two sets are axially alined, said lip resiliently urging said portions into and releasably holding the latter in locking relationship.

6. A connector for hoses and the like having, in combination, a first elongated tubular member made of rigid material and having an outer inlet end portion and an inner end portion, said member defining a first axial passage extending from said inlet end portion into said inner end portion, said inner end portion including an axial flange surrounding said passage and stopping short of the inner end of said member and an integral cylindrical skirt spaced radially outwardly from said flange and projecting beyond the end of the flange, a generally cylindrical seal made of a resilient material and disposed within said first member with its outer surface bearing against the inside of said skirt, said seal having a first portion projecting into the space between said skirt and said flange and a second portion extending beyond the end of the flange but stopping short of the end of its skirt whereby said second portion forms a continuation of said passage, said seal including an integral lip projecting radially inwardly from the free end of said second portion and being inclined away from said inlet end of said member, a second elongated tubular member made of a rigid material and having an outer outlet end portion and a cylindrical inner end portion, said cylindrical inner end portion being smaller in diameter than said skirt to project into the latter, an axially facing annular sealing surface formed on the end of said cylindrical end portion to engage and flatten said lip as the cylindrical end portion is projected into said skirt, said second member defining a second passage alined with said first passage, an annular flange formed on the exterior of said second member intermediate the ends thereof, a cylindrical sleeve rigid with the periphery of said annular flange and extending away from said outlet end portion and beyond said sealing surface to telescope said skirt on the outer side thereof when said cylindrical inner end portion is projected into the skirt, the inner surface of said sleeve being spaced from and opposing the outer surface of said skirt, and means including coacting parts formed on the opposing surfaces of said sleeve and said skirt, said parts being operable to permit said axial inner end portion to be projected into said skirt and thereafter move into locking engagement when one of said members is turned relative to the other of said members thereby to lock said members together, said lip engaging said sealing surface and being progressively flattened thereby as said cylindrical inner end portion is projected into said skirt and said lip resiliently hold said parts in locking engagement after said members have been turned relative to each other.

7. A connector as defined in claim 6 in which each of said tubular members is individually molded of a rigid plastic material.

8. A connector as defined in claim 6 in which the end portion of said seal opposite said lip is in a pocket defined by the space between said axial flange and said skirt and the inner diameter of said seal increases progressively toward said lip whereby pressure fluid flowing through said passages produces a force on said seal which force holds the seal against the inside of said skirt and urges said end portion of the seal tightly into said pocket.

9. A connector as defined in claim 6 including an annular groove formed in said sealing surface whereby, when water under pressure is flowing through said members as said cylindrical inner end portion is being projected into said skirt, the water impinging said groove backwashes and cleans said sealing surface and the opposing surface of said lip.

10. A connector as defined in claim 9 including a plurality of openings formed in said annular flange whereby any water deflected radially outwardly by said sealing surface is further deflected axially by said sleeve and passes through said openings.

11. A connector as defined in claim 10 including axially projecting teeth formed on the end of said skirt and operable to scrape foreign matter from said annular flange as said members are turned relative to each other, said foreign matter passing through said openings.

* * * * *